United States Patent [19]
Po' et al.

[11] Patent Number: 5,266,676
[45] Date of Patent: Nov. 30, 1993

[54] LOW-CRYSTALLIZATION-SPEED POLYESTERS, AND PROCESS FOR THEIR PREPARATION

[75] Inventors: Riccardo Po'; Ernesto Occhiello; Fabio Garbassi, all of Novara; Luigi Pelosini, Fontaneto D'Agogna, all of Italy

[73] Assignee: Istituto Guido Donegani S.p.A., Novarra, Italy

[21] Appl. No.: 914,850

[22] Filed: Jul. 15, 1992

[30] Foreign Application Priority Data

Jul. 18, 1991 [IT] Italy .................. MI91 A/001992

[51] Int. Cl.$^5$ .................................. C08G 63/20
[52] U.S. Cl. ............................. 528/272; 528/296; 528/298; 528/299; 528/302; 528/305; 528/307; 528/308; 264/176.1; 264/299; 264/328.1
[58] Field of Search ............... 528/272, 296, 298, 299, 528/302, 305, 307, 308; 264/176.1, 299, 328.1

[56] References Cited

FOREIGN PATENT DOCUMENTS 202631 5/1986 European Pat. Off. .
0368690 5/1990 European Pat. Off. .
0465040 1/1992 European Pat. Off. .

OTHER PUBLICATIONS

Mariano Pracella et al., Blends of Poly(tetramethylene terephthalate) with a Liquid-Crystalline Polyester, Poly(decamethylene 4,4'-terephthaloyl-dioxybenzoate), Crystallization Kinetics and Melting Behaviour, vol. 190, No. 1, Jan. 1989, pp. 175-192.

Bilibin et al., Thermotropic Polyesters, 2, Synthesis of Regular Polyesters From Aromatic Dicarboxylic Acids and Phenols or Aliphatic Diols, and Study of Their Mesomorphic Properties, vol. 186, No. 8, Aug. 1985 pp. 1575-1591.

Chemical Abstracts, vol. 99, N.218533, 1983 vol. 97, N.72969, 1982.

Comprehensive Polymer Science, G. C. Eastwood, Oxford 1989, vol. 5, p. 275.

Primary Examiner—Morton Foelak
Assistant Examiner—S. A. Acquah
Attorney, Agent, or Firm—Shea & Gould

[57] ABSTRACT

Low-crystallization-speed polyesters obtained by means of the polycondensation of 2,6-naphthalene-dicarboxy acid with at least one $(C_2-C_{10})$-(cyclo)alkylene glycol in the presence of 0.5–50 mol % of a copolymerizable reactant of general formula:

ROOC—Ar—OOC—Ar'—COO—Ar—COOR (I)

wherein Ar and Ar' stand for aromatic radicals, and R stands for a hydrogen atom or a $(C_1-C_4)$-alkyl radical, or the OR group is replaced by a halogen.

17 Claims, No Drawings

LOW-CRYSTALLIZATION-SPEED POLYESTERS, AND PROCESS FOR THEIR PREPARATION

The present invention relates to polyesters with low crystallization speed, and to the process for preparing them.

More particularly, the present invention relates to polyesters of 2,6-naphthalene-dicarboxy acid, which display a low crystallization speed, to the process for preparing them, and to their use in the preparation of shaped bodies obtained by means of the usual techniques of transformation of thermoplastic polymers.

It is well-known that polyester resins, such as poly(naphthalene terephthalate) (PEN) display attractive physical and chemical characteristics which make them particularly suitable for preparing fibres, films, hollow containers, moulded articles, and so forth.

It is well-known as well that the crystallization behaviour of these resins has a strong influence on may of the above applications, and displays obvious drawbacks.

For example, when fibres suitable for high-speed spinning processes are manufactured, having avaiable polyesters which crystallize very slowly (generally, at a lower speed than non-modified resin) is important, because, on the contrary, a frequent breaking of the fibres would be experienced, with consequent undesired discontinuances of production cycle.

In technical literature, polyesters modified with comonomers which reduce their crystallization speed were proposed, which are suitable for use in fibre production.

For example, in European patent Application published under No. 202,631, PET types with a reduced crystallization speed are disclosed, which are modified with amounts comprised within the range of from 1 to 50% by weight of such monomers as dimethyl 2,6-naphthalene dicarboxylate, p-hydroxy benzoic acid, 4,4'-biphenylene dicarboxylic acid and trimellitic acid.

Also in the injection-moulding of the blanks for PET or PEN bottle production, it is important that the crystallization of the sprue is minimized in the point in which said sprue is connected with the blanck, in that in this way the impact strenght of the finished article is improved. For that purpose, long heating times and higher processing temperatures are adopted in the blowing cycle, with self-explanatory disadvantages as regards the productivity on one hand, and energy requirements on the other hand.

The present Applicant has found now that 2,6-naphthalene dicarboxylic acid polyester resins with low crystallization speed—and therefore particularly suitable for manufacturing those finished articles, such as fibres and bottles, for which a high crystallization speed is an undesired property—can be obtained by using in the polymerization mixture particular comonomers of essentially aromatic character. In the resulting polymers, the properties of the equivalent resins in their non-modified state are retained unchanged, and a decrease of melting temperature, as compared to the non-modified polymer, can be observed.

A decrease in polymer melting temperature results in smaller amounts of heat having to be supplied to the material, and consequently in the possibility of achieving considerable energy savings. A further advantage derives from the lower rate of development of aldehydes during the processing step—which development rate is known to be the higher, the higher the temperature to which the polymer is submitted.

Furthermore, if the crystallization speed is low enough, parisons can be easily obtained in bottle manufacturing sector, which have a higher thickness, without said parison crystallizing and turning into opaque.

Therefore, an object of the present invention are the low-crystallization-speed polyesters obtained by means of the polycondensation of at least one ($C_2$-$C_{10}$)-alkylene or-cycloalkylene glycol with a mixture constituted by 2,6-naphthalene dicarbolyic acid, or a derivative thereof, optionally substituted with halogens, such as chlorine, or ($C_1$-$C_4$)-alkyl radicals and 0.5-50 mol %, relatively to total mols, of a copolymerizable reactant having the general formula:

ROOC—Ar—OOC—Ar'—COO—Ar—COOR    (I)

wherein

Ar and Ar' which may be the same, or different from each other, represent aromatic radicals of from 6 to 20 carbon atoms, and R represents a hydrogen atom or a ($C_1$-$C_4$)-alkyl radical, or the OR group is replaced by a halogen.

Preferred polyesters according to the present invention are those obtained in the presence of 0.5-8 mol % of the reactant having the general formula (I).

Preferred reactants having the general formula (I) are those in which R represents a hydrogen atom, or a methyl or ethyl radical and in which Ar' and Ar are selected from benzene radicals or naphthalene radicals, in particular naphthalene radicals with reactive functions in (1,3)-, (1,6)-, (2,3)-. (2,6)- or (2,7) -positions.

Particularly suitable alkylene glycols for use in the instant invention are ethylene glycol, tetramethylene glycol and cyclohexane-dimethanol.

The compounds having the general formula (I) are known products, and their preparation is described in chemical literature, in particular in the papers reported by Chemical Abstracts Vol. 99, No. 218533, 1983; and Vol. 97, No. 72969, 1982.

In these papers, said compounds are synthetized by means of the condensation of an aroyl dichloride

ClOC—Ar'—COCl with an aromatic acid (or a corresponding aliphatic ester) bearing a substituent hydroxy group on one of its aromatic ring positions, in aliphatic of aromatic hydrocarbon solvents, chlorinated solvents or ethereal solvents, and in the presence of bases as HCl acceptors.

The synthesis of these compounds can also be carried out by interfacial way, using a double phase system constituted by water and a water-immiscible organic solvent.

The low-crystallization-speed polyesters according to the present invention have an intrinsic viscosity, as measured in phenol/tetrachloroethane (in the ratio of 60/40 by weight) at 30° C. and at the concentration of 0.25 g/dl, higher than 0.4 dl/g, generally comprised within the range of from 0.5 to 1.5 dl/g, a crystallization temperature lower than 220° C., generally comprised within the range of from 200 to room temperature, and a glass transition temperature (Tg) higher than 115° C Said polyesters are suitable for use in order to obtain shaped bodies which can be manufactured by means of common technologies for thermoplastic polymers fabrication such as, e.g., injection-moulding or extrusion.

they can be transformed into films or fibres, can be used as matrix phases for composite materials based on fibres or inorganic fillers, and can be used as mixtures with other polymers, or with common additives known in the art of plastics processing.

A process for preparing the low-crystallization-speed polyesters according to the present invention comprises causing at least one $(C_2-C_{10})$-alkylene or -cycloalkylene glycol to react with a mixture constituted by optionally substituted 2,6-naphthalene dicarboxylic acid, or a derivative thereof, such a $(C_1-C_4)$-alkyl ester, an acyl halide or an acid anhydride, and 0.5–50 mol %, relatively to total mols of a copolymerizable reactant having the general formula:

ROOC—Ar—OOC—Ar'—COO—Ar—COOR wherein Ar, Ar' and R have the same meanings as indicated hereinabove.

More particularly, the process according to the present invention can be accomplished in accordance with as described in "Comprehensive Polymer Science", G. C. Eastmond, A. Ledwith, S. Russo, P. Singwalt Eds., Pergamon Press, Oxford 1989, Vol. 5, page 275.

In a typical synthesis procedure starting from the diester of the dicarboxy acid, the reaction mixture is purged, is charged under an inert atmosphere (nitrogen) and is heated to 180° C., temperature at which the alcohol formed during the reaction of alcoholysis distils off. The temperature is then gradually increased up to 280°–290° C., and the pressure is decreased down to 0.1–0.2 Torr, so as to favour the polycondensation.

The reactions occuring during the above synthesis routes are catalysed by compounds of acidic character, such as protic acids, such as $H_2SO_4$, p-toluenesulfonic acid, and so forth, or Lewis' acids, such as zinc, manganese, cobalt, magnesium acetate, and so forth. During the polycondensation step, the use of acidic oxides, such as antimony and germanium oxide, or of transition metal alkoxides, such as titanium tetra(isopropoxide), results to be advantageous.

The importance of the instant finding cannot go unnoticed by those skilled in the art. The possibility of being endowed with a lower crystallization speed renders these polyesters attractive for application in the sector of high-speed fibre spinning and in the sector of parison moulding for bottle manufacturing. Furthermore, thanks to the lower melting temperature of these compounds, the development of aldehydes during the processing thereof can be considerably descreased.

In the following some examples are reported for merely illustrative purposes, and in no way the following examples should be construed as being limitative of the same invention.

EXAMPLE 1

This example discloses the preparation of a polyester from ethylene glycol, dimethyl 2,6-naphthalene dicarboxylate and dimethyl 4,4'-(isophthaloyl dioxy) dibenzoate.

144.9 g (0.594 mol) of dimethyl 2,6-naphthalene-dicarboxylate, 2.60 g (0.006 mol) of dimethyl 4,4'-(isophthaloyl dioxy) dibenzoate, 82.5 g (1.33 mol) of ethylene glycol and 112 mg of manganese acetate tetra-hydrate were charged to a glass flask of 500 ml of capacity.

The reaction mixture was heated up to 180° C. and was kept at that temperature during an approximately 90-minute time, in order to cause methanol to distil off, then the temperature was increased up to 240° C. and 52 mg of antimony trioxide and 440 mg of 3,5-di-tert-butyl-4-hydroxy-anisole were added. The pressure was then gradually decreased down to 0.1 Torr; and the temperature was increased up to 300° C.; the reaction mass was kept about 30 minutes under these conditions. Throughout this time period, the excess of ethylene glycol was removed.

After bringing the system back to room temperature and at atmospheric pressure with $N_2$, the resulting polymer, recovered and crushed, had an intrinsic viscosity of 0.60 dl/g, as measured in phenol/tetrachloroethane mixture (in the ratio of 60/40 by weight) at 30° C. and at the concentration of 0.25 g/dl.

The glass transition temperature (Tg), the crystallization temperature (Tc) and the melting temperature (Tm) were determined by differential scanning calorimetry (DSC). In this particular case, values of Tg, Tc and Tm respectively of 119° C. and 263° C. were obtained.

EXAMPLE 2

The procedure of Example 1 was repeated, save that a larger amount of dimethyl 4,4'-(isophthaloyl dioxy)-dibenzoate was used.

143.5 g (0.588 mol) of dimethyl 2,6-naphthalene-dicarboxylate, 5.21 g (0.012 mol) of dimethyl 4,4'-(isophthaloyl dioxy) dibenzoate, 82.5 g (1.33 mol) of ethylene glycol and 105 mg of manganese acetate tetrahydrate were charged to a glass flask of 250 ml of capacity.

The reaction mixture was heated up to 180° C. and was kept at that temperature during an approximately 90-minute time, in order to cause methanol to distill off, then the temperature was increased up to 240° C. and 53 mg of antimony trioxide, and 180 mg of 3,5-di-tert.-butyl-4-hydroxy-anisole and 300 mg of triphenyl phosphate were added. The pressure was then gradually decreased down to 0.1 Torr, and the temperature was increased up to 290° C.; the reaction mass was kept about 30 minutes under these conditions. Throughout this time period, the excess of ethylene glycol was removed.

After bringing the system back to room temperature and at atmospheric pressure with $N_2$, the resulting polymer, recovered and crushed, had an intrinsic viscosity of 0.57 dl/g, a Tg value of 118° C., and a Tm value of 255° C. The polymer does not crystallize.

COMPARATIVE EXAMPLE

The procedure of Example 1 was repeated in order to synthesize a poly ethylene(2,6-naphtlakene dicarboxylate) to be used as control.

14.0 kg of dimethyl 2,6-naphthalene-dicarboxylate, 7.850 kg of ethylene glycol and 4.2 of manganese acetate tetrahydrate were charged to a stainless steel reactor of 40 l of capacity, under an inert atmosphere. The temperature of the mixture was increased up to 180° C., and methanol developed during the reaction was distilled off. After increasing the temperature up to 240° C., 3.64 g of phosphorous acid and 36 g of IRGANOX 1010 were added, followed by 4.0 g of antimony trioxide.

The pressure inside the reactor was caused to gradually decrease down to 0.5 Torr, while the temperature was simultaneously increased up to 290° C. After a 1.5-hour reaction time, and after bringing the reaction system back to room temperature and atmospheric pressure, the polymer was recovered. The resulting polymer has an intrinsic viscosity of 0.57 dl/g, a Tg value of 120° C., a Tc value of 225° C. and a Tm value of 268° C.

We claim:

1. Low-crystallization-speed polyesters obtained by means of the polycondensation of at least one ($C_2$–$C_{10}$)alkylene or -cycloalkylene glycol with a mixture of a 2,6-naphthalene dicarboxylic acid, or a derivate thereof and 0.5–50 mol %, relatively to total mols, of a reactant having the general formula:

ROOC—Ar—OOC—Ar'—COO—Ar—COOR  (I)

wherein

Ar and Ar' which may be the same, or different from each other, represent aromatic radicals of from 6 to 20 carbon atoms, and R represents a hydrogen atom or a ($C_1$–$C_4$)-alkyl radical, or the OR group is replaced by a halogen.

2. Polyesters according to claim 1, obtained in the presence of 0.5–8 mol % of reactant having the general formula (I).

3. Polyesters according to claim 1, in which the reactants having the general formula (I) are those in which R represents a hydrogen atom, or a methyl or ethyl radical and in which Ar' and Ar are selected from benzene radicals or naphthalene radicals.

4. Polyesters according to claim 1 in which said glycols are selected from ethylene glycol, tetramethylene glycol and cyclohexane-dimethanol.

5. Low-crystallization-speed polyesters according to claim 1, having an intrinsic viscosity, as measured in phenol/tetrachloroethane (in the ratio of 60/40 by weight) at 30° C. and at the concentration of 0.25 g/dl, higher than 0.4 dl/g, a crystallization temperature lower than 200° C., and a glass transition temperature (Tg) higher than 115° C.

6. A process for preparing a low-crystallization-speed polyester, which comprises polycondensing at least one ($C_2$–$C_{10}$)-akylene or -cycloaklylene glycol with a mixture of a 2,6-napthalene dicarboxylic acid, or a derivative thereof, and 0.5–50 mol. %, relative to total mols, of a reactant having the general formula:

ROOC—Ar—OOC—Ar'—COO—Ar—COOR wherein Ar and Ar', which may be the same or different, represent aromatic radicals of from 6 to 20 carbon atoms and R represents a hydrogen atom or a ($C_1$–$C_4$)-alkyl radical or the OR group is replaced by a halogen.

7. Low-crystallization-speed polyesters according to claim 1, wherein the 2,6-naphthalene dicarboxylic acid, or a derivative thereof, is substituted with halogen.

8. Low-crystallization-speed polyesters according to claim 7, wherein the halogen is chlorine.

9. Low-crystallization-speed polyesters according to claim 1, wherein the 2,6-naphthalene dicarboxylic acid, or a derivative thereof is substituted with ($C_1$–$C_4$)-alkyl radicals.

10. Low-crystallization-speed polyesters according to claim 3, wherein the naphthalene radical contains reactive functionality in a position selected from the (1,3)-, (1,6)-, (2,3)-, (2,6)-, and (2,7)-positions.

11. Low-crystallization-speed polyesters according to claim 5, wherein the intrinsic viscosity is within the range of from 0.5 to 1.5 dl/g.

12. A process for preparing low-crystallization-speed polyesters according to claim 6, wherein the 2,6-naphthalene dicarboxylic acid or a derivative thereof is substituted with halogen.

13. A process for preparing low-crystallization-speed polyesters according to claim 12, wherein the halogen is chlorine.

14. A process for preparing a low-crystallization-speed polyesters according to claim 6, wherein the 2,6-naphthalene dicarboxylic acid or a derivative thereof is substituted with ($C_1$–$C_4$)-alkyl radicals.

15. A process for preparing low-crystallization-speed polyesters according to claim 6 wherein the derivative of 2,6-naphthalene dicarboxylic acid is selected from the group of esters, acyl halides, and acid anhydrides.

16. A process for high-speed fiber spinning, said process comprising using fibres comprised of low-crystallization-speed polyesters according to claim 1.

17. A process for blank molding for bottle manufacturing, said process comprising using blanks comprised of low-crystallization-speed polyesters according to claim 1.

* * * * *